Feb. 17, 1948.   N. A. TORNBLOM   2,436,127
EXPLOSION PROOF SWIVEL PIPE JOINT
Filed Jan. 24, 1947
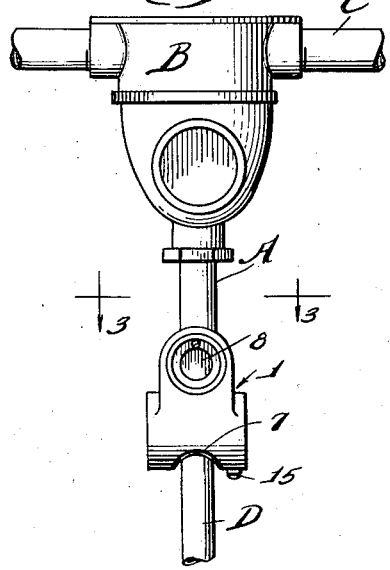
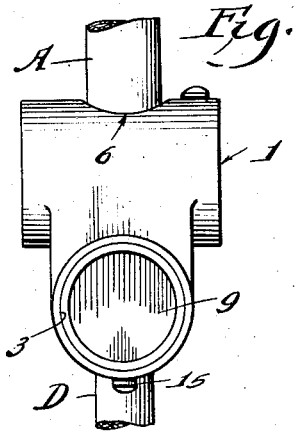
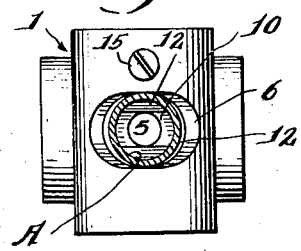
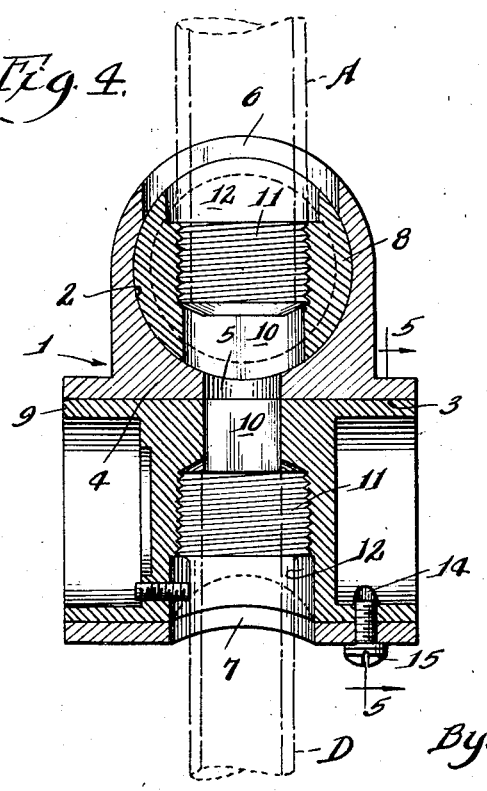
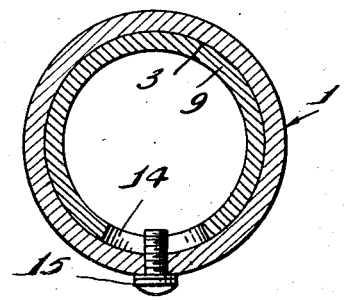
Inventor:
Nils A. Tornblom,
By Wm F. Freudenreich,
Attorney.

Patented Feb. 17, 1948

2,436,127

UNITED STATES PATENT OFFICE 2,436,127

EXPLOSION-PROOF SWIVEL PIPE JOINT

Nils A. Tornblom, Chicago, Ill., assignor to Appleton Electric Company, a corporation of Illinois Application January 24, 1947, Serial No. 723,997

3 Claims. (Cl. 285—96.1)

1

It is common practice to house the wires of electrical distribution systems, in buildings, mines and elsewhere, in conduits provided with outlet or connection boxes. Where the surrounding atmosphere is or may be of the explosive type the conduit system must be made explosion proof so that a spark or flame occurring within the conduits will be extinguished before it can reach the surrounding atmosphere. That is not enough, if the fixtures supplied with current through the outlet or connection boxes are not, also, explosion proof. One such source of danger is lighting fixtures suspended from such boxes by pipes or tubes. If a lighting fixture is supported in such a manner that it has more or less freedom of swinging movement, namely when a swivel joint is used, a failure in the seal of the conduit system may occur at such joint.

The object of the present invention is to produce a simple, novel, efficient and durable explosion proof swivel joint for suspending a lighting fixture, for example, on the lower end of a pipe or other tubular member.

The various features of novelty whereby the present invention is characterized will hereinafter be pointed out with particularity in the claims; but, for a full understanding of the invention and of its objects and advantages, reference may be had to the following detailed description taken in connection with the accompanying drawing, wherein:

Figure 1 is an elevational view of a device embodying the present invention, hung from an outlet box; Fig. 2 is an elevational view of said device, on a somewhat larger scale, looking at the same from a point to the right of Fig. 1, the outlet box being omitted; Fig. 3 is a section taken on line 3—3 of Fig. 1, but the scale being the same as that of Fig. 2; Fig. 4 is a section, on a still larger scale, on a plane containing the axis of the device as a whole and the axis of one of the trunnions; and Fig. 5 is a section on line 5—5 of Fig. 4.

Referring to the drawing, I represents a metal body member having therein two large, like, openended cylindrical bores, 2 and 3, crossing each other at right angles at the axis of the device and each being symmetrically disposed with respect with such axis. The bores are spaced apart a short distance to provide a fairly thin wall or partition 4 between the same. This wall contains a hole 5, that is preferably round, large enough for the passage of wires leading to a lamp or the like, connecting the two bores together. The outer half of the wall surrounding each bore is preferably fairly thin and in the form of a half

2 cylinder; and each contains a window disposed symmetrically relative to the axis of the device and being elongated circumferentially of the adjacent bore. These windows are numbered 6 and 7, respectively.

Within, rotatable in, and yet closely fitting each of the bores 2 and 3 is a cylindrical filler of the same length as the bore; the fillers being the elements 8 and 9 in the drawing. These fillers constitute trunnions to which pipe sections may be attached so as normally to be coaxial with the body member; each, however, being adapted to swing in a plane containing the axis of the device; and the two such planes being at right angles to each other. Each trunnion has a large passage extending diametrically through the same midway between its ends. The inner end 10 of each passage is about as wide, measured in the direction of the length of its trunnion, as the diameter of hole 5 in the body member and is substantially longer in the circumferential direction. Section 10 merges into a screw-threaded section 11 larger in diameter than the width of section 10; so that when a pipe is screwed in through the outer end it cannot go in too far. The extreme outer end section 12 of each of said passages may be enlarged a little and be without screw threads to provide a cavity into which the pipe may be set, without danger of marring the body member, before the screw thread thereon meshes with that in the trunnion. After a piece of pipe has been screwed into a trunnion, the latter cannot be removed from the body member without first unscrewing the pipe. However, the trunnion can rock within limits determined by the length of the window, 6 or 7, through whichever the pipe enters.

In order to prevent the trunnions from shifting lengthwise and dropping out before a pipe is screwed into the same, I provide each trunnion near one end, with a circumferential groove or slot 14 into which a screw 15, carried by the body member extends. These grooves or slots are made so long that during the use of the device the screws do not reach the ends thereof and, therefore exert no influence on the amplitude of the rocking movements of the trunnions after a device is installed. However, this screw and slot connection serves roughly to center each trunnion so that a workman will have no difficulty in turning a trunnion into such angular position that a pipe may be screwed into the same.

Since the two bores, with their trunnions, are exactly alike, it makes no difference which pipe is screwed into either trunnion and no time need be wasted to determine which end should be uppermost.

In Fig. 1 there is screwed into the top of the device a pipe section A which depends from an outlet box B, or the like, connected into a conduit system of which a fragment C is shown. A pipe D is screwed into the device from the bottom; this pipe serving to support a lamp, not shown. It will be seen that pipe A is larger in diameter than pipe D; the smaller pipe being simply provided with any usual adapter that fits the screw thread in the trunnion element.

The wires are of course brought from the outlet box through pipe A, the swivel device and pipe D to the instrumentality to which current is to be supplied. By circumferentially elongating the inner sections 10 of the passages through the trunnions, neither trunnion can turn far enough in either direction to exert a shearing action on the wires or to cramp them in any way.

Any flame that might be born in the conduit system, of which the passages or tunnel through the swivel device forms a part, could not reach the surrounding atmosphere except by travelling lengthwise of the peripheries of the trunnions. Any path that a flame could thus travel is so long and confined, however, that the flame would be extinguished long before it could reach the open atmosphere.

It will thus be seen that I have produced an extremely rugged and easily-made device composed of three simple parts which, when connected to two pipes, constitutes a swivel joint between them, the necessary wires extending through an axial open-ended tunnel that does not press on the wires even though sections of the tunnel move out of true alignment with other sections in swivelling.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. An explosion proof swivel pipe joint device comprising a body member containing two cylindrical bores spaced apart and crossing each other at right angles at the axis of said device, trunnions each filling one of said bores and being rotatable therein, said device having an axial tunnel extending through the body member and the trunnions, that portion of the tunnel in each trunnion having screw threads for engagement with the screw threaded end of a pipe, and that portion of the tunnel in the body member outwardly from each bore, and through which the corresponding pipe enters, being elongated circumferentially of that bore.

2. A device as set forth in claim 1, wherein each trunnion has a circumferential slot and the body member has screws extending into said slots.

3. An explosion proof movable pipe joint device comprising a body member having a cylindrical bore extending transversely through the same, a long trunnion filling said bore and rotatable therein, said device having an axial tunnel extending through the body and the trunnion crosswise of the latter, the end of the tunnel beyond one side of the trunnion being widened circumferentially of the bore, means to connect a pipe to the opposite end of the tunnel, and screw threads in that part of the tunnel contained in the trunnion for cooperation with screw threads on a pipe entered through the widened end of the tunnel.

NILS A. TORNBLOM.

REFERENCES CITED

The following references are of record in the file of this patent:

UNITED STATES PATENTS

| Number | Name | Date |
| --- | --- | --- |
| 998,884 | Elvin | July 25, 1911 |
| 1,648,624 | Schultz | Nov. 8, 1927 |

FOREIGN PATENTS

| Number | Country | Date |
| --- | --- | --- |
| 455,712 | Germany | Feb. 1928 |